Dec. 29, 1964 L. W. STOWE 3,163,859

CODE CONVERSION DEVICE

Filed March 21, 1962

INVENTOR
LLOYD W. STOWE

BY David Lesclaine

ATTORNEY 3,163,859

CODE CONVERSION DEVICE

Lloyd W. Stowe, Broomall, Pa., assignor to Sperry Rand Corporation, New York, N.Y., a corporation of Delaware Filed Mar. 21, 1962, Ser. No. 181,279
8 Claims. (Cl. 340—347)

This invention relates to a device for translating information or data in one system of notation into data in a second or further system of notation and more particularly to a device for converting a single unit of data or information into successive units of data or information in different scales of notation at consecutive time periods.

Due to the wide acceptance of computing devices in many fields of science and industry, it is necessary to construct calculating devices to meet a wide variety of needs. These needs may be expressed as different requirements for storage, operating speed, size of the word to be handled in the calculation, and other such similar factors. To design components for each of these systems is expensive and requires much repetition of the same basic design techniques. It is much simpler to permit the use of a single element in a number of computing devices making proper allowance for the differences in physical characteristic which exists between the element and the system in which it is to be employed. It is thus possible for example to employ a single magnetic core memory matrix, which has sixteen planes and is capable of supplying a sixteen bit binary word in a device requiring 48 binary bits, simply by the system of addressing the same memory matrix three successive times. The only requirement which would be placed upon such a system is that the three addresses which are used to select the three 16 bit binary words are unique. In other words that each address will select a portion of the matrix which is not addressable by the other two addresses.

It is therefore an object of this invention to provide a translating device which may accept a first unit of information or data in a first system of notation and translate it to further units of information or data in further systems of notation.

It is a further object of this invention to provide a translating device whereby an original unit of information or data may be converted into successive discrete units of information or data in different systems of notation at successive time periods.

It is another object of this invention to provide a translating device which may convert a number in coded decimal form into a further series of numbers each of which is in another form.

Briefly stated, the invention (in its preferred form) consists of employing a register device capable of storing three computer digits in coded decimal form and translating these digits by means of a logical gate matrix into a plurality of unique effective addresses during separate time periods as defined by individual start pulses. In operation the register is loaded with the 12 bits of the control address, during a first start time, which bits are employed a first effective address composed of 12 binary digits which may be employed to address the actual matrix. During a second time period as established by a second start pulse, the effective address which has been employed during first time pulse is modified to provide a second effective address which will be employed during this time period to further address the matrix. And finally, during the time of a third start pulse the effective address generated as a result of the second pulse is again modified to provide a third effective address to address the memory a third time. In this manner it is possible to employ the matrix which has only 16 planes and will provide 16 binary bits to provide the required 48 bits of the using device. This procedure may be employed for read in or read out purposes from the matrix.

Other objects and features of the invention will be pointed out in the following description and claims and illustrated in the accompanying drawings, which disclose, by way of example, the principle of the invention, and the best mode which has been contemplated for carrying it out.

Figure 1:
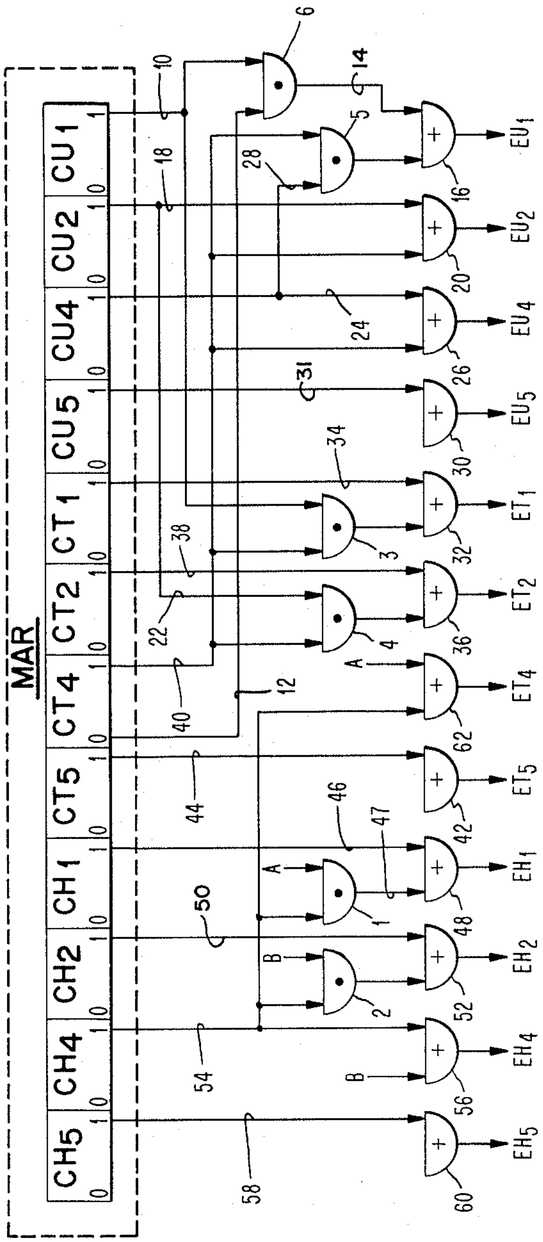
FIGURE 1 illustrates a device constructed in accordance with the basic concept of the invention.

Referring now to FIGURE 1 there is shown a translating device constructed in accordance with this invention. The input information or control address is placed into a register designated as the memory address register or MAR, composed of 12 flip-flops designated $CH_5$, $CH_4$, $CH_2$, $CH_1$, $CT_5$, $CT_4$, $CT_2$, $CT_1$, $CU_5$, $CU_4$, $CU_2$ and $CU_1$. These 12 flip-flops represent the three coded decimal digits of the control address. The flip-flops $CU_5$, $CU_4$, $CU_2$, and $CU_1$ represent the most significant bit, the third significant bit, the second significant bit and the least significant bit of the units order of the control address. Similarly, the flip-flops $CT_5$, $CT_4$, $CT_2$, and $CT_1$ represent the most significant bit, third significant bit, second significant bit and least significant bit of the tens order of the control address. The flip-flops $CH_5$, $CH_4$, $CH_2$, and $CH_1$ represent respectively the most significant bit, the third significant bit, the second significant bit and the least significant bit of the hundreds order of the control address. The control address is stored into the flip-flops of the MAR in a coded decimal form employing the values of 5, 4, 2 and 1. The information is stored into these flip-flops according to the following table, with columnar weights as indicated:

*Table I*

| Decimal Digit | BiQuinary Code MSB 5421 LSB |
|---|---|
| A | 0101 |
| B | 0110 |
| C | 0111 |
| Numerics: | |
| 0 | 0000 |
| 1 | 0001 |
| 2 | 0010 |
| 3 | 0011 |
| 4 | 0100 |
| 5 | 1000 |
| 6 | 1001 |
| 7 | 1010 |
| 8 | 1011 |
| 9 | 1100 |
| F | 1101 |
| G | 1110 |
| H | 1111 |

Simplification, in order to achieve uniqueness may be predicated upon the following analysis of the digits (numeric) which can exist as the control address digits. Considering the numerics 0 through 9, the digits 0 through 4 are symmetrical with the digits 5 through 9 with the exception that a zero occupies the most significant bit position of the digits 0 through 4 whereas a one occupies the most significant bit position of the digits 5 through 9. Thus the same circuitry may be employed for all digits 0 through 9 providing the most significant bit position is properly accounted for. Next, if the third bit position is considered, it can be seen that if a one exists in that position, the bits of the second bit position as well as the least significant bit position must both be zero. This is true because to allow a bit in either position when the third bit position contains a one would result in a non-numeric value. The second bit position as well as the least significant bit position follow a normal binary counting scheme.

These factors may be used to assure uniqueness in the following manner. If, for example, a first group of originally inserted control addresses is chosen so as not to contain bits in the third positions of the tens and hundreds orders then a first effective address is formed, which can later be modified by the selective addition of bits in these positions. A second group of originally inserted control addresses can be chosen so as to contain bits in the third bit positions of the tens and hundreds orders, thus effective addresses are created which can be modified by adding digits to the lowest significant position or the second bit position of the hundreds order.

Control addresses which permit the formation of effective addresses in the manner just described are set forth below in Tables II and II*a* and indicated as patterns A, B, C and D. Thus by employing the digits in the table of control addresses it is possible to initially select a set of control addresses whose digits are individually distinct and unique from one another.

*Table II*

| A | | | | B | C | D |
|---|---|---|---|---|---|---|
| 000–004<br>010–014<br>020–024<br>030–034 | 100–104<br>110–114<br>120–124<br>130–134 | 200–204<br>210–214<br>220–224<br>230–234 | 300–304<br>310–314<br>320 324<br>330–334 | 040–044<br>140–144<br>240–244<br>340–344 | 400–404<br>410–414<br>420–424<br>430–434 | 440–444 |

*Table IIa*

A. CONTROLLING ADDRESSES

[No bits in $H_4$ or $T_4$ positions]

| | $H_5$ | $H_4$ | $H_2$ | $H_1$ | $T_5$ | $T_4$ | $T_2$ | $T_1$ | $U_5$ | $U_4$ | $U_2$ | $U_1$ |
|---|---|---|---|---|---|---|---|---|---|---|---|---|
| 000 | 0 | 0 | 0 | 0 | 0 | 0 | 0 | 0 | 0 | 0 | 0 | 0 |
| 001 | 0 | 0 | 0 | 0 | 0 | 0 | 0 | 0 | 0 | 0 | 0 | 1 |
| 002 | 0 | 0 | 0 | 0 | 0 | 0 | 0 | 0 | 0 | 0 | 1 | 0 |
| 003 | 0 | 0 | 0 | 0 | 0 | 0 | 0 | 0 | 0 | 0 | 1 | 1 |
| 004 | 0 | 0 | 0 | 0 | 0 | 0 | 0 | 0 | 0 | 1 | 0 | 0 |
| 010 | 0 | 0 | 0 | 0 | 0 | 0 | 0 | 1 | 0 | 0 | 0 | 0 |
| 011 | 0 | 0 | 0 | 0 | 0 | 0 | 0 | 1 | 0 | 0 | 0 | 1 |
| 012 | 0 | 0 | 0 | 0 | 0 | 0 | 0 | 1 | 0 | 0 | 1 | 0 |
| 013 | 0 | 0 | 0 | 0 | 0 | 0 | 0 | 1 | 0 | 0 | 1 | 1 |
| 014 | 0 | 0 | 0 | 0 | 0 | 0 | 0 | 1 | 0 | 1 | 0 | 0 |
| 020 | 0 | 0 | 0 | 0 | 0 | 0 | 1 | 0 | 0 | 0 | 0 | 0 |
| 021 | 0 | 0 | 0 | 0 | 0 | 0 | 1 | 0 | 0 | 0 | 0 | 1 |
| 022 | 0 | 0 | 0 | 0 | 0 | 0 | 1 | 0 | 0 | 0 | 1 | 0 |
| 023 | 0 | 0 | 0 | 0 | 0 | 0 | 1 | 0 | 0 | 0 | 1 | 1 |
| 024 | 0 | 0 | 0 | 0 | 0 | 0 | 1 | 0 | 0 | 1 | 0 | 0 |
| 030 | 0 | 0 | 0 | 0 | 0 | 0 | 1 | 1 | 0 | 0 | 0 | 0 |
| 031 | 0 | 0 | 0 | 0 | 0 | 0 | 1 | 1 | 0 | 0 | 0 | 1 |
| 032 | 0 | 0 | 0 | 0 | 0 | 0 | 1 | 1 | 0 | 0 | 1 | 0 |
| 033 | 0 | 0 | 0 | 0 | 0 | 0 | 1 | 1 | 0 | 0 | 1 | 1 |
| 034 | 0 | 0 | 0 | 0 | 0 | 0 | 1 | 1 | 0 | 1 | 0 | 0 |
| 100 | 0 | 0 | 0 | 1 | 0 | 0 | 0 | 0 | 0 | 0 | 0 | 0 |
| 101 | 0 | 0 | 0 | 1 | 0 | 0 | 0 | 0 | 0 | 0 | 0 | 1 |
| 102 | 0 | 0 | 0 | 1 | 0 | 0 | 0 | 0 | 0 | 0 | 1 | 0 |
| 103 | 0 | 0 | 0 | 1 | 0 | 0 | 0 | 0 | 0 | 0 | 1 | 1 |
| 104 | 0 | 0 | 0 | 1 | 0 | 0 | 0 | 0 | 0 | 1 | 0 | 0 |
| 110 | 0 | 0 | 0 | 1 | 0 | 0 | 0 | 1 | 0 | 0 | 0 | 0 |
| 111 | 0 | 0 | 0 | 1 | 0 | 0 | 0 | 1 | 0 | 0 | 0 | 1 |
| 112 | 0 | 0 | 0 | 1 | 0 | 0 | 0 | 1 | 0 | 0 | 1 | 0 |
| 113 | 0 | 0 | 0 | 1 | 0 | 0 | 0 | 1 | 0 | 0 | 1 | 1 |
| 114 | 0 | 0 | 0 | 1 | 0 | 0 | 0 | 1 | 0 | 1 | 0 | 0 |
| 120 | 0 | 0 | 0 | 1 | 0 | 0 | 1 | 0 | 0 | 0 | 0 | 0 |
| 121 | 0 | 0 | 0 | 1 | 0 | 0 | 1 | 0 | 0 | 0 | 0 | 1 |
| 122 | 0 | 0 | 0 | 1 | 0 | 0 | 1 | 0 | 0 | 0 | 1 | 0 |
| 123 | 0 | 0 | 0 | 1 | 0 | 0 | 1 | 0 | 0 | 0 | 1 | 1 |
| 124 | 0 | 0 | 0 | 1 | 0 | 0 | 1 | 0 | 0 | 1 | 0 | 0 |
| 130 | 0 | 0 | 0 | 1 | 0 | 0 | 1 | 1 | 0 | 0 | 0 | 0 |
| 131 | 0 | 0 | 0 | 1 | 0 | 0 | 1 | 1 | 0 | 0 | 0 | 1 |
| 132 | 0 | 0 | 0 | 1 | 0 | 0 | 1 | 1 | 0 | 0 | 1 | 0 |
| 133 | 0 | 0 | 0 | 1 | 0 | 0 | 1 | 1 | 0 | 0 | 1 | 1 |
| 134 | 0 | 0 | 0 | 1 | 0 | 0 | 1 | 1 | 0 | 1 | 0 | 0 |
| 200 | 0 | 0 | 1 | 0 | 0 | 0 | 0 | 0 | 0 | 0 | 0 | 0 |
| 201 | 0 | 0 | 1 | 0 | 0 | 0 | 0 | 0 | 0 | 0 | 0 | 1 |
| 202 | 0 | 0 | 1 | 0 | 0 | 0 | 0 | 0 | 0 | 0 | 1 | 0 |
| 203 | 0 | 0 | 1 | 0 | 0 | 0 | 0 | 0 | 0 | 0 | 1 | 1 |
| 204 | 0 | 0 | 1 | 0 | 0 | 0 | 0 | 0 | 0 | 1 | 0 | 0 |
| 210 | 0 | 0 | 1 | 0 | 0 | 0 | 0 | 1 | 0 | 0 | 0 | 0 |
| 211 | 0 | 0 | 1 | 0 | 0 | 0 | 0 | 1 | 0 | 0 | 0 | 1 |
| 212 | 0 | 0 | 1 | 0 | 0 | 0 | 0 | 1 | 0 | 0 | 1 | 0 |
| 213 | 0 | 0 | 1 | 0 | 0 | 0 | 0 | 1 | 0 | 0 | 1 | 1 |
| 214 | 0 | 0 | 1 | 0 | 0 | 0 | 0 | 1 | 0 | 1 | 0 | 0 |
| 220 | 0 | 0 | 1 | 0 | 0 | 0 | 1 | 0 | 0 | 0 | 0 | 0 |
| 221 | 0 | 0 | 1 | 0 | 0 | 0 | 1 | 0 | 0 | 0 | 0 | 1 |

*Table IIa*—Continued

A. CONTROLLING ADDRESSES

| | $H_5$ | $H_4$ | $H_2$ | $H_1$ | $T_5$ | $T_4$ | $T_2$ | $T_1$ | $U_5$ | $U_4$ | $U_2$ | $U_1$ |
|---|---|---|---|---|---|---|---|---|---|---|---|---|
| 222 | 0 | 0 | 1 | 0 | 0 | 0 | 1 | 0 | 0 | 0 | 1 | 0 |
| 223 | 0 | 0 | 1 | 0 | 0 | 0 | 1 | 0 | 0 | 0 | 1 | 1 |
| 224 | 0 | 0 | 1 | 0 | 0 | 0 | 1 | 0 | 0 | 1 | 0 | 0 |
| 230 | 0 | 0 | 1 | 0 | 0 | 0 | 1 | 1 | 0 | 0 | 0 | 0 |
| 231 | 0 | 0 | 1 | 0 | 0 | 0 | 1 | 1 | 0 | 0 | 0 | 1 |
| 232 | 0 | 0 | 1 | 0 | 0 | 0 | 1 | 1 | 0 | 0 | 1 | 0 |
| 233 | 0 | 0 | 1 | 0 | 0 | 0 | 1 | 1 | 0 | 0 | 1 | 1 |
| 234 | 0 | 0 | 1 | 0 | 0 | 0 | 1 | 1 | 0 | 1 | 0 | 0 |
| 300 | 0 | 0 | 1 | 1 | 0 | 0 | 0 | 0 | 0 | 0 | 0 | 0 |
| 301 | 0 | 0 | 1 | 1 | 0 | 0 | 0 | 0 | 0 | 0 | 0 | 1 |
| 302 | 0 | 0 | 1 | 1 | 0 | 0 | 0 | 0 | 0 | 0 | 1 | 0 |
| 303 | 0 | 0 | 1 | 1 | 0 | 0 | 0 | 0 | 0 | 0 | 1 | 1 |
| 304 | 0 | 0 | 1 | 1 | 0 | 0 | 0 | 0 | 0 | 1 | 0 | 0 |
| 310 | 0 | 0 | 1 | 1 | 0 | 0 | 0 | 1 | 0 | 0 | 0 | 0 |
| 311 | 0 | 0 | 1 | 1 | 0 | 0 | 0 | 1 | 0 | 0 | 0 | 1 |
| 312 | 0 | 0 | 1 | 1 | 0 | 0 | 0 | 1 | 0 | 0 | 1 | 0 |
| 313 | 0 | 0 | 1 | 1 | 0 | 0 | 0 | 1 | 0 | 0 | 1 | 1 |
| 314 | 0 | 0 | 1 | 1 | 0 | 0 | 0 | 1 | 0 | 1 | 0 | 0 |
| 320 | 0 | 0 | 1 | 1 | 0 | 0 | 1 | 0 | 0 | 0 | 0 | 0 |
| 321 | 0 | 0 | 1 | 1 | 0 | 0 | 1 | 0 | 0 | 0 | 0 | 1 |
| 322 | 0 | 0 | 1 | 1 | 0 | 0 | 1 | 0 | 0 | 0 | 1 | 0 |
| 323 | 0 | 0 | 1 | 1 | 0 | 0 | 1 | 0 | 0 | 0 | 1 | 1 |
| 324 | 0 | 0 | 1 | 1 | 0 | 0 | 1 | 0 | 0 | 1 | 0 | 0 |
| 330 | 0 | 0 | 1 | 1 | 0 | 0 | 1 | 1 | 0 | 0 | 0 | 0 |
| 331 | 0 | 0 | 1 | 1 | 0 | 0 | 1 | 1 | 0 | 0 | 0 | 1 |
| 332 | 0 | 0 | 1 | 1 | 0 | 0 | 1 | 1 | 0 | 0 | 1 | 0 |
| 333 | 0 | 0 | 1 | 1 | 0 | 0 | 1 | 1 | 0 | 0 | 1 | 1 |
| 334 | 0 | 0 | 1 | 1 | 0 | 0 | 1 | 1 | 0 | 1 | 0 | 0 |

B. CONTROLLING ADDRESSES

[Bit always present in $T_4$ position]

| | $H_5$ | $H_4$ | $H_2$ | $H_1$ | $T_5$ | $T_4$ | $T_2$ | $T_1$ | $U_5$ | $U_4$ | $U_2$ | $U_1$ |
|---|---|---|---|---|---|---|---|---|---|---|---|---|
| 040 | 0 | 0 | 0 | 0 | 0 | 1 | 0 | 0 | 0 | 0 | 0 | 0 |
| 041 | 0 | 0 | 0 | 0 | 0 | 1 | 0 | 0 | 0 | 0 | 0 | 1 |
| 042 | 0 | 0 | 0 | 0 | 0 | 1 | 0 | 0 | 0 | 0 | 1 | 0 |
| 043 | 0 | 0 | 0 | 0 | 0 | 1 | 0 | 0 | 0 | 0 | 1 | 1 |
| 044 | 0 | 0 | 0 | 0 | 0 | 1 | 0 | 0 | 0 | 1 | 0 | 0 |
| 140 | 0 | 0 | 0 | 1 | 0 | 1 | 0 | 0 | 0 | 0 | 0 | 0 |
| 141 | 0 | 0 | 0 | 1 | 0 | 1 | 0 | 0 | 0 | 0 | 0 | 1 |
| 142 | 0 | 0 | 0 | 1 | 0 | 1 | 0 | 0 | 0 | 0 | 1 | 0 |
| 143 | 0 | 0 | 0 | 1 | 0 | 1 | 0 | 0 | 0 | 0 | 1 | 1 |
| 144 | 0 | 0 | 0 | 1 | 0 | 1 | 0 | 0 | 0 | 1 | 0 | 0 |
| 240 | 0 | 0 | 1 | 0 | 0 | 1 | 0 | 0 | 0 | 0 | 0 | 0 |
| 241 | 0 | 0 | 1 | 0 | 0 | 1 | 0 | 0 | 0 | 0 | 0 | 1 |
| 242 | 0 | 0 | 1 | 0 | 0 | 1 | 0 | 0 | 0 | 0 | 1 | 0 |
| 243 | 0 | 0 | 1 | 0 | 0 | 1 | 0 | 0 | 0 | 0 | 1 | 1 |
| 244 | 0 | 0 | 1 | 0 | 0 | 1 | 0 | 0 | 0 | 1 | 0 | 0 |
| 340 | 0 | 0 | 1 | 1 | 0 | 1 | 0 | 0 | 0 | 0 | 0 | 0 |
| 341 | 0 | 0 | 1 | 1 | 0 | 1 | 0 | 0 | 0 | 0 | 0 | 1 |
| 342 | 0 | 0 | 1 | 1 | 0 | 1 | 0 | 0 | 0 | 0 | 1 | 0 |
| 343 | 0 | 0 | 1 | 1 | 0 | 1 | 0 | 0 | 0 | 0 | 1 | 1 |
| 344 | 0 | 0 | 1 | 1 | 0 | 1 | 0 | 0 | 0 | 1 | 0 | 0 |

C. CONTROLLING ADDRESSES

[Presence of $H_4$ bit]

| | $H_5$ | $H_4$ | $H_2$ | $H_1$ | $T_5$ | $T_4$ | $T_2$ | $T_1$ | $U_5$ | $U_4$ | $U_2$ | $U_1$ |
|---|---|---|---|---|---|---|---|---|---|---|---|---|
| 400 | 0 | 1 | 0 | 0 | 0 | 0 | 0 | 0 | 0 | 0 | 0 | 0 |
| 401 | 0 | 1 | 0 | 0 | 0 | 0 | 0 | 0 | 0 | 0 | 0 | 1 |
| 402 | 0 | 1 | 0 | 0 | 0 | 0 | 0 | 0 | 0 | 0 | 1 | 0 |
| 403 | 0 | 1 | 0 | 0 | 0 | 0 | 0 | 0 | 0 | 0 | 1 | 1 |
| 404 | 0 | 1 | 0 | 0 | 0 | 0 | 0 | 0 | 0 | 1 | 0 | 0 |
| 410 | 0 | 1 | 0 | 0 | 0 | 0 | 0 | 1 | 0 | 0 | 0 | 0 |
| 411 | 0 | 1 | 0 | 0 | 0 | 0 | 0 | 1 | 0 | 0 | 0 | 1 |
| 412 | 0 | 1 | 0 | 0 | 0 | 0 | 0 | 1 | 0 | 0 | 1 | 0 |
| 413 | 0 | 1 | 0 | 0 | 0 | 0 | 0 | 1 | 0 | 0 | 1 | 1 |
| 414 | 0 | 1 | 0 | 0 | 0 | 0 | 0 | 1 | 0 | 1 | 0 | 0 |
| 420 | 0 | 1 | 0 | 0 | 0 | 0 | 1 | 0 | 0 | 0 | 0 | 0 |
| 421 | 0 | 1 | 0 | 0 | 0 | 0 | 1 | 0 | 0 | 0 | 0 | 1 |
| 422 | 0 | 1 | 0 | 0 | 0 | 0 | 1 | 0 | 0 | 0 | 1 | 0 |
| 423 | 0 | 1 | 0 | 0 | 0 | 0 | 1 | 0 | 0 | 0 | 1 | 1 |
| 424 | 0 | 1 | 0 | 0 | 0 | 0 | 1 | 0 | 0 | 1 | 0 | 0 |
| 430 | 0 | 1 | 0 | 0 | 0 | 0 | 1 | 1 | 0 | 0 | 0 | 0 |
| 431 | 0 | 1 | 0 | 0 | 0 | 0 | 1 | 1 | 0 | 0 | 0 | 1 |
| 432 | 0 | 1 | 0 | 0 | 0 | 0 | 1 | 1 | 0 | 0 | 1 | 0 |
| 433 | 0 | 1 | 0 | 0 | 0 | 0 | 1 | 1 | 0 | 0 | 1 | 1 |
| 434 | 0 | 1 | 0 | 0 | 0 | 0 | 1 | 1 | 0 | 1 | 0 | 0 |

D. CONTROLLING ADDRESSES

[Presence of $H_4$ and $T_4$]

| | $H_5$ | $H_4$ | $H_2$ | $H_1$ | $T_5$ | $T_4$ | $T_2$ | $T_1$ | $U_5$ | $U_4$ | $U_2$ | $U_1$ |
|---|---|---|---|---|---|---|---|---|---|---|---|---|
| 440 | 0 | 1 | 0 | 0 | 0 | 1 | 0 | 0 | 0 | 0 | 0 | 0 |
| 441 | 0 | 1 | 0 | 0 | 0 | 1 | 0 | 0 | 0 | 0 | 0 | 1 |
| 442 | 0 | 1 | 0 | 0 | 0 | 1 | 0 | 0 | 0 | 0 | 1 | 0 |
| 443 | 0 | 1 | 0 | 0 | 0 | 1 | 0 | 0 | 0 | 0 | 1 | 1 |
| 444 | 0 | 1 | 0 | 0 | 0 | 1 | 0 | 0 | 0 | 1 | 0 | 0 |

The control address set out above in the Tables II and IIa are arranged to have zeros in the most significant bit positions of the digits in the units, tens and hundreds orders for illustrative purposes only. These most significant digits may be any combination of ones and zeros, from all zeros, as shown, to all ones. The rules for the formation of the effective addresses will be the same for all the remaining bit positions regardless of the most significant bit value. The value of the most significant bit of the control address will be used directly, and the equivalent bit of the effective address will always be the same as the bit of the control address. An original controlling address is set up in the flip-flops of the MAR and will remain there unchanged through the entire operation of the device. It will be the outputs of these particular flip-flops plus certain other special signals on the effective lines, designated lines $EH_5$, $EH_4$, $EH_2$, $EH_1$, $ET_5$, $ET_4$, $ET_2$, $ET_1$, $EU_5$ $EU_4$, $EU_2$, and $EU_1$ which will affect the actual selection and will be considered the effective addresses for selection purposes. In order to continue the uniqueness which has been shown by the control addresses in Table II it is necessary to alter the control addresses according to particular patterns depending upon whether the control addresses fall into groups A, B, C or D. The manner of alteration will be set forth below.

The flip-flops of the MAR register are well known in the art and are of the type which when storing a zero or in the reset condition, provides a low output on the zero line and a high output on the one line whereas when it is storing a one or in the set condition, the zero line is high and the one line is low. The one output of flip-flop $CU_1$ is connected by a line 10 to the right input terminal of an "And" gate 6, the left input of which is supplied by the zero output of flip-flop $CT_4$ over line 12. The output of the "And" gate 6 is supplied over a line 14 to the "Or" gate 16. Flip-flop $CU_2$ has its one line connected via line 18 to one terminal of the "Or" circuit 20 and further connects to one input of the "And" circuit 4 via the line 22. The one terminal of flip-flop $CU_4$ is connected via line 24 to an input of the "Or" circuit 26 and is further connected via line 28 to the input of "And" circuit 5. The one terminal of the flip-flop $CU_5$ is connected directly to the "Or" circuit 30 by the line 31, whereas the one line of the flip-flop $CT_1$ is connected directly to an "Or" circuit 32 by a line 34. The one output of flip-flop $CT_2$ is connected directly to an "Or" circuit 36 via a line 38. The one output of flip-flop $CT_4$ is connected via line 40 to an input of the "And" circuit 4, to an input of the "And" circuit 3 to an input of the "Or" circuit 26 and finally to an input of the "And" circuit 5 as set forth above. The output 1 of flip-flop $CT_5$ is connected directly to the "Or" circuit 42 via line 44. The output of flip-flop $CH_1$, that is the one output, is supplied via a line 46 to an input of the "Or" gate 48, whereas the one output of flip-flop $CH_2$ is connected via line 50 to the "Or" circuit 52. The one output of flip-flop $CH_4$ is connected via line 54 to one input of an "Or" circuit 56 the other input of which is supplied by a B pulse. Further the one output terminal of flip-flop $CH_4$ is also connected to an input of the "And" circuit 2 which receives as its other input a further B pulse, and to the "And" circuit 1 which receives as its other input an A pulse. The output of the "And" circuit 2 is connected to a further input of the "Or" circuit 52, whereas the output of the "And" circuit 1 is connected by line 47 to the input of "Or" circuit 48. The one output of flip-flop $CH_5$ is connected via a line 58 to an "Or" circuit 60.

Figure 3:
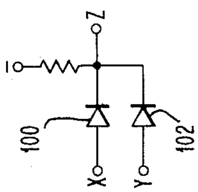
FIGURE 3 illustrates a logical "And" gate.

Referring briefly to FIGURE 3 the manner of construction and operation of the "And" circuits of FIGURE 1 will be described. The "And" circuit of FIGURE 3 is composed of a first diode 100 and a second diode 102 connected with their cathodes commoned to a resistor and negative supply. Input voltages are applied at the terminals designated X and Y to the plates of the respective diodes 100 and 102, the output being taken from the terminal designated Z. In operation if negative pulses are applied to both the terminals X and Y a negative pulse will be produced at the output of the terminal Z. However, should a positive pulse appear at either of the inputs X or Y then the output at Z will be positive. Or, stated another way, if the inputs at X and Y are low then the output at terminal Z is also low whereas if the input to either of the terminals X or Y should be high the output at Z is also high. The terms high and positive or low and negative will be used interchangeably and should be understood as such.

Figure 4:
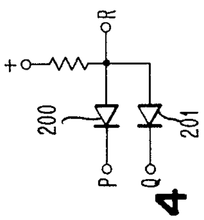
FIGURE 4 illustrates a logical "Or" gate.

Referring now to FIGURE 4, the manner of construction and operation of the negative "Or" circuits employed in FIGURE 1 are described. The gate is constructed using two diodes designated 200 and 201 arranged to have their plates commoned via a resistor to a positive source. Pulses are applied to their bases via terminals P and Q of the two diodes 200 and 201 respectively, the output being taken from the terminal designated R. The gate operates to provide a negative or low output at the terminal R upon the occurrence of a single negative pulse or low pulse on either of the terminals P or Q to the diodes 200 and 201 respectively. The exact manner of operation of these two diodes is not set forth in that they are considered to be well known in the art.

Referring again to FIGURE 1, it is assumed that a control address having a configuration designated under the A grouping of Table II has been set into the register. During the first time period outputs will be available at the respective "Or" circuits of the three sections of the register $EH_4$, $EH_2$, $EH_1$, $ET_4$, $ET_2$, $ET_1$ $EU_4$, $EU_2$, and $EU_1$, depending upon the settings of the respective flip-flops of the register MAR. It should be remembered that flip-flops $CU_5$, $CT_5$ and $CH_5$ will be set to zero (in this example) and the outputs on lines $EU_5$, $ET_5$ and $EH_5$ will accordingly be high. An inspection of Table IIa, containing the same information as Table II but in fully expanded coded decimal form, indicates the following: The flip-flops $CH_5$, $CT_5$, and $CU_5$ are not set. Further, the flip-flops $CH_4$ and $CT_4$ are also not set for an A group address. This results in the outputs of the flip-flops $CT_4$ and $CH_4$ providing a low output on their zero lines and a high output on their one lines. The effect of the low output on the line 12 of the flip-flop $CT_4$ is to enable or alert the "And" gate 6 for operation. The high output on the line 40 from the one output terminal of flip-flop $CT_4$ produces a disabling or inhibit effect upon the "And" gates 3 and 4 as well as the "And" gate 5. It should be remembered from the discussion of the operation of the "And" gate of FIGURE 3 that if a low or enabling pulse is placed upon one input the gate will be made operative upon the introduction of a further low to the additional terminal of the gate whereas if a high has been placed upon the gate the subsequent application of a low to the other terminal will be ineffective to cause the gate to conduct and in effect the application of this high acts as an inhibiting or disabling pulse. The one or high output of flip-flop $CH_4$ on the line 54 will act to disable the "And" gates 1 and 2, and apply a single high input to the "Or" circuits 56 and 62. The result of this manner of operation is to produce an effective address during the first time period which is the same as the controlling address for digits within the group designated A of Table II. For example, if the register were storing the value 004 the output of "Or" gate 26 to line $EU_4$ would be low, whereas the output of all the other "Or" circuits would be high, thereby causing an effective selection of the matrix address 4. It should be remembered that all selection and actuating purposes are served by the use of low pulses whereas the highs serve merely as inhibit pulses for gating purposes. During a second time period the address stored in the memory address register MAR has its output effect modified. It should be recalled that the contents of the memory address register (MAR) are not altered during the three time periods to generate the further unique addresses but rather than the output effects by means of the various gates are altered according to the time period involved. To effect the selection of a second address when the value stored in MAR is within the group A of Table II, an A pulse is applied to the "Or" gate 62 during the entire period of selection of the second address so as to provide an $ET_4$ signal of one regardless of the actual value of the control address stored in MAR. Thus the second effective address will be the same as the control address except that there will be a one present at the output $ET_4$ for all control addresses in group A despite the fact that no original control address in group A could contain a pulse in the $CT_4$ position. The A pulse applied to "And" gate 1 will be ineffective to produce an output because the second input to "And" gate 1 supplied by the one output terminal of flip-flop $CH_4$ will be high during any group A control address and inhibits gate 1.

During the third time period the address stored in the MAR has its output effect modified a second time to produce the third unique effective address. This address is created from the control address by causing a one to appear at the $EH_4$ line even though no input pulse can be present (in this example) in the $CH_4$ flip-flop. This modification results from the introduction of a B pulse to the "Or" gate 56 during this time period. The B pulse applied to "And" gate 2 is ineffective to produce an output due to the fact that the one output of flip-flop $CH_4$ is always high for a control address in group A. Thus the effective address during this third time period will be the original control address plus a one inserted at line $EH_4$ regardless of the other values stored in MAR.

Assuming now that a controlling address lying within the group B of Table II had originally been inserted into the memory address register MAR, the following effective addresses would be generated during the successive time periods. The B group addresses always having a one in the $CT_4$ position will result in the flip-flop $CT_4$ producing a low output on its one terminal which will have the effect of alerting the "And" circuits 3, 4 and 5 as well as presenting a constant low output condition to the "Or" circuits 20 and 26 thus providing a constant low output on lines $EU_4$ and $EU_2$. The high output on the zero line 12 flip-flop ($CT_4$) will cause the "And" gate 6 to be disabled. It should be noted that the flip-flops $CT_1$ and $CT_2$ when storing any address within the B group will always be in the zero condition causing a high output to be available on the one lines of both of these flip-flops. Further, since the flip-flop $CH_4$ will store a zero during all of the address conditions (now being discussed) it also provides a high output on its one line to the "And" circuits 1 and 2 as well as the "Or" circuit 56. The effect of the high on the zero line 12 of flip-flop $CT_4$ to the "And" gate 6 will result in its inability to produce an output in response to the condition of the flip-flop $CU_1$. It will be appreciated if "And" gate 6 fails to produce an output the "Or" circuit 16 which is driven by this gate may not produce an $EU_1$ signal. However an $EU_1$ signal will be produced when a one is stored in the flip-flops $CU_4$ and $CT_4$ as a result of the application of pulses to the "And" gate 5 which also may supply the "Or" circuit 16 providing an output on line $EU_1$. As a result of this arrangement the following effective address is available during the first time period if a value in the B group is established in the register MAR:

The output on line $EU_1$ will follow the setting of the flip-flop $CU_4$, the outputs of $EU_4$ and $EU_2$ will be one regardless of the settings of the respective flip-flops $CU_4$ and $CU_2$, the output of $EU_5$ will continually be zero for the operation. The output line $ET_1$ will follow the setting of the flip-flop $CU_1$ while the output $ET_2$ will follow the setting of flip-flop $CU_2$, the outputs $ET_4$ and $ET_5$ being zero. The output on the line $EH_1$ will be in accordance with the setting of flip-flop $CH_1$ and $EH_2$ will follow that of $CH_2$. The output lines $EH_4$ and $EH_5$ will remain zero for this example.

In order to produce the second effective address during a second time period with a word originally in the group B of Table II the effective address generated during the first time period will be modified by inserting a pulse on the output selection line $ET_4$. This obtains because the A pulse is introduced to input of "Or" gate 62 during the second time period. Hence, a second effective address results which is the same as the first effective address with the exception that a one will appear on the $ET_4$ line regardless of the content of the MAR. The A pulse at "And" gate 1 does not effect the selection line $EH_1$ due to the fact flip-flop $CH_4$ is always in a zero or reset condition for any group B controlling address.

The third effective address is generated from the first effective address by the insertion of a B pulse to the "Or" gate 56 causing a one to appear on the $EH_4$ line regardless of the content of the flip-flop $CH_4$. The B pulse applied to "And" gate 2 is ineffective due to the fact that flip-flop $CH_4$ is always zero for an address of group B. An example of the manner of operation of the device to produce an effective address for an original B group controlling address (see Table II) is given below:

If the original address stored in the MAR was 40 (i.e., 040) then the flip-flops therein would be set in the following manner, $CH_5$, $CH_4$, $CH_2$ and $CH_1$ would all be set to zero. $CT_5$, $CT_2$ and $CT_1$ would each be set to zero whereas $CT_4$ would be set to one. The flip-flops $CU_5$, $CU_4$, $CU_2$ and $CU_1$ all store a zero. The outputs that will be produced on the output lines of the connector will be as follows: $EU_1$ and $EU_5$ will remain zero, $EU_4$ and $EU_2$ will take the one configuration, the output lines $ET_5$, $ET_4$, $ET_2$ and $ET_1$ will all be in the zero form, as will be the lines $EH_5$, $EH_4$, $EH_2$ and $EH_1$. During the second time period the same effective address pattern will be shown with the addition of a pulse corresponding to the $ET_4$ output line produced in response to the pulse applied to buffer 62. Further, during the third time period the configuration will be the same as the original effective address pattern with the exception that there will now be a pulse present on the $EH_4$ line produced in response to the B pulse applied to buffer 56.

The manner of operation of the device with an address lying in the C group of Table II will now be set forth. The effective address signals which result during the first time period, from the control address in group C, will cause address signals to be generated having the following values: The outputs on lines $EU_5$, $EU_4$, $EU_2$ and $EU_1$ will be the same as that stored in the respective flip-flops $CU_5$, $CU_4$, $CU_2$ and $CU_1$. Further, the outputs on the lines $ET_5$, $ET_2$ and $ET_1$ will also be similar to that stored in their respective flip-flops $CT_5$, $CT_2$ and $CT_1$. The one exception will be that the output on the line $ET_4$ will be one regardless of the setting of the respective flip-flop $CT_4$. Position $EH_4$, will be one due to the setting of its respective flip-flop $CH_4$ which is always one for a group C control address. The outputs on $EH_2$ and $EH_1$ will similarly be zero due to the setting of their respective flip-flops $CH_2$ and $CH_1$ which are zero for a group C control address. Further the output of the flip-flop $CH_5$ will cause a zero output on the line $EH_5$ through this entire operation.

The effective address generated during the second start pulse period is the same as the effective address which has been generated in the first time period with the addition of an output pulse on the lowest significant bit of the hundreds digit or the line $EH_1$ regardless of its actual setting. This is caused by the application of the A pulse during the second time period continually being gated through to the "Or" circuit 48 through the gate 1 due to the fact that $CH_4$ is always in its one condition providing a low pulse over line 54 to the "And" gate 1 at any time that a group C controlling address is present. The A pulse to "Or" gate 62 does not effect the result generated because a one is always supplied to line $ET_4$ by flip-flop $CH_4$ for any group C control address.

The third effective address during the starting pulse period 3 is the effective address generated during the first time period with a bit added to the second significant position of the hundreds digit or the $EH_2$ position due to the fact that a B pulse generated during the third start pulse period is applied to the "And" gate 2 at the same time the one output of $CH_4$ is applied to the same gate. As stated above the one output of the $CH_4$ flip-flop is always low during a group C controlling address. The B pulse applied to the "Or" gate 56 does not effect the output on line $EH_4$ because a one is continually applied by flip-flop $CH_4$ for a group C address.

Lastly the effective addresses being generated from group D controlling address of Table II are set forth. The group D controlling address will develop effective address patterns which are mainly determined by the one stored in the flip-flop $CT_4$ and the one bit stored in the flip-flop $CH_4$. The effective address which is developed from the controlling address will first take on a pattern of the following sort: The lines $EU_4$ and $EU_2$ will be one regardless of the settings of the respective flip-flops $CU_4$ and $CU_2$ whereas the output of $EU_1$ will follow the contents of the flip-flop $CU_4$ rather than its respective flip-flop $CU_1$. The output of the line $EU_5$ follows $CT_5$ and in this example is zero. The output of line $ET_1$ will follow the output of the flip-flop $CU_1$ rather than its respective flip-flop $CT_1$ in the present example and in a similar manner the output of line $ET_2$ will follow the output of flip-flop $CU_2$. The output of $ET_4$ will remain one through the entire operation whereas the output of $ET_5$ will remain zero in this example. The outputs of lines $EH_5$, $EH_2$ and $EH_1$ will remain zero during a group D controlling address whereas the line $EH_4$ will remain one because of the presence of a one in $CH_4$ for all group D addresses.

During the second time period the effective address developed during the first time period is altered to include a digit in the lowest significant bit position of the hundreds digit by having a bit forced through the "Or" circuit 48 to line $EH_1$ as a result of the A pulse which is available only during the second time period and the pulse available on the output of the $CH_4$ flip-flop which remains set to the one condition during any group D control address. The continuous one output prevents the application of the other A pulse to "Or" gate 62 from affecting the result.

During the third time period a pulse formation similar to that for the first effective address is developed with the mere exception that a bit is now available in the second bit position of the hundreds digit or the output of line $EH_2$ as a result of the B digit being applied to the "And" circuit 2 only during the third time period; the other input to said "And" circuit 2 being provided by the one output of flip-flop $CH_4$ which is continually on during a group D controlling address. The fact that flip-flop $CH_4$ is one throughout all group D control address also accounts for the B pulse being ineffective to change the value on line $EH_4$.

The operation as set forth above is summarized by means of the Tables III*a* to *d*. At the top of each table is indicated the condition of certain flip-flops not part of the particular group being considered, but which affect the result. The three columns under the heading MAR indicate the original control address digit placed in these particular flip-flops. The nine columns under the headings 1, 2 and 3 indicate the outputs on the selection lines due to the effective addresses generated during the three start pulse periods. It should be remembered that the effective outputs of lines 4, 2 and 1 will be the same regardless of the value of the 5 line or the value stored in the "5" flip-flop.

*Table IIIa*

[$CT_4$=1]

| MAR | | | 1 | | | 2 | | | 3 | | |
|---|---|---|---|---|---|---|---|---|---|---|---|
| $CU_4$ | $CU_2$ | $CU_1$ | $EU_4$ | $EU_2$ | $EU_1$ | $EU_4$ | $EU_2$ | $EU_1$ | $EU_4$ | $EU_2$ | $EU_1$ |
| 0 | 0 | 0 | 0 | 0 | 0 | 0 | 0 | 0 | 0 | 0 | 0 |
| 0 | 0 | 1 | 0 | 0 | 1 | 0 | 0 | 1 | 0 | 0 | 1 |
| 0 | 1 | 0 | 0 | 1 | 0 | 0 | 1 | 0 | 0 | 1 | 0 |
| 0 | 1 | 1 | 0 | 1 | 1 | 0 | 1 | 1 | 0 | 1 | 1 |
| 1 | 0 | 0 | 1 | 0 | 0 | 1 | 0 | 0 | 1 | 0 | 0 |

*Table IIIb*

[$CT_4$=1]

| MAR | | | 1 | | | 2 | | | 3 | | |
|---|---|---|---|---|---|---|---|---|---|---|---|
| $CU_4$ | $CU_2$ | $CU_1$ | $EU_4$ | $EU_2$ | $EU_1$ | $EU_4$ | $EU_2$ | $EU_1$ | $EU_4$ | $EU_2$ | $EU_1$ |
| 0 | 0 | 0 | 1 | 1 | 0 | 1 | 1 | 0 | 1 | 1 | 0 |
| 0 | 0 | 1 | 1 | 1 | 0 | 1 | 1 | 0 | 1 | 1 | 0 |
| 0 | 1 | 0 | 1 | 1 | 0 | 1 | 1 | 0 | 1 | 1 | 0 |
| 0 | 1 | 1 | 1 | 1 | 0 | 1 | 1 | 0 | 1 | 1 | 0 |
| 1 | 0 | 0 | 1 | 1 | 1 | 1 | 1 | 1 | 1 | 1 | 1 |

*Table IIIc*

[$CH_4$, $CU_1$ and $CU_1$=0]

| MAR | | | 1 | | | 2 | | | 3 | | |
|---|---|---|---|---|---|---|---|---|---|---|---|
| $CT_4$ | $CT_2$ | $CT_1$ | $ET_4$ | $ET_2$ | $ET_1$ | $ET_4$ | $ET_2$ | $ET_1$ | $ET_4$ | $ET_2$ | $ET_1$ |
| 0 | 0 | 0 | 0 | 0 | 0 | 1 | 0 | 0 | 0 | 0 | 0 |
| 0 | 0 | 1 | 0 | 0 | 1 | 1 | 0 | 1 | 0 | 0 | 1 |
| 0 | 1 | 0 | 0 | 1 | 0 | 1 | 1 | 0 | 0 | 1 | 0 |
| 0 | 1 | 1 | 0 | 1 | 1 | 1 | 1 | 1 | 0 | 1 | 1 |
| 1 | 0 | 0 | 0 | 0 | 0 | 1 | 0 | 0 | 0 | 0 | 0 |
| 1 | 0 | 0 | 0 | 1 | 0 | 1 | 1 | 0 | 0 | 1 | 0 if $CU_1$=1 |
| 1 | 0 | 0 | 0 | 1 | 0 | 1 | 1 | 0 | 0 | 1 | 0 if $CU_2$=1 |
| 1 | 0 | 0 | 0 | 1 | 1 | 1 | 1 | 1 | 0 | 1 | 1 if $CU_1$ and $CU_2$ are equal to 1 |

*Table IIId*

| MAR | | | 1 | | | 2 | | | 3 | | |
|---|---|---|---|---|---|---|---|---|---|---|---|
| $CH_4$ | $CH_2$ | $CH_1$ | $EH_4$ | $EH_2$ | $EH_1$ | $EH_4$ | $EH_2$ | $EH_1$ | $EH_4$ | $EH_2$ | $EH_1$ |
| 0 | 0 | 0 | 0 | 0 | 0 | 0 | 0 | 0 | 1 | 0 | 0 |
| 0 | 0 | 1 | 0 | 0 | 1 | 0 | 0 | 1 | 1 | 0 | 1 |
| 0 | 1 | 0 | 0 | 1 | 0 | 0 | 1 | 0 | 1 | 1 | 0 |
| 0 | 1 | 1 | 0 | 1 | 1 | 0 | 1 | 1 | 1 | 1 | 1 |
| 1 | 0 | 0 | 1 | 0 | 0 | 1 | 0 | 1 | 1 | 1 | 0 |
| 1 | 0 | 0 | | | | 1 | 0 | 1 | 1 | 1 | 0 |
| 1 | 0 | 1 | | | | 1 | 0 | 1 | 1 | 1 | 1 |
| 1 | 1 | 0 | | | | 1 | 1 | 1 | 1 | 1 | 0 |
| 1 | 1 | 1 | | | | 1 | 1 | 1 | 1 | 1 | 1 |
| 1 | 0 | 0 | | | | 1 | 0 | 1 | 1 | 1 | 0 |

Figure 2:
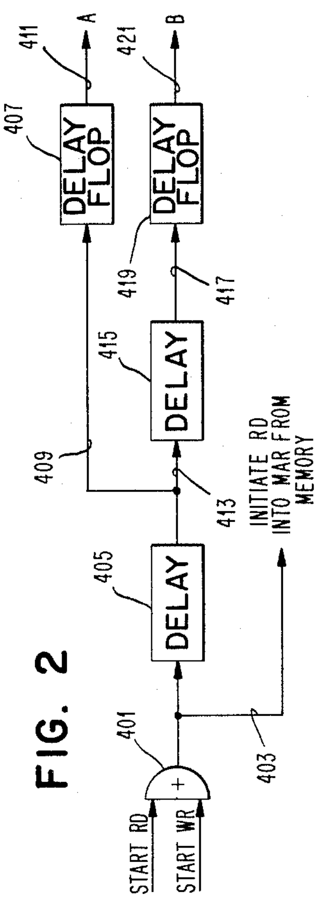
FIGURE 2 shows a timing control device which may be employed with the device of FIGURE 1.

Referring now to FIGURE 2 the device for generating the various control pulses required to establish the three discrete effective addresses will now be set forth. Depending upon whether the operation is to be a read into the memory or a read from the memory an original start read or start write pulse is generated by the main control system (not shown) to the respective input of an "Or" circuit 401. The output of the "Or" circuit 401 on the line 403 is employed to control the gating (not shown) necessary to permit the reading from the main memory of an original control address into the MAR. The output of the "Or" gate 401 is also introduced to the input of a delay network, 405 of a type well-known in the art, which is so chosen that it will delay the input pulse a sufficient length of time to permit the read out of the address designated by the MAR and its utilization. When the signal in delay 405 emerges at the end of the delay interval, it is fed to a delay flop 407 via line 409. The delay flop produces an output on the line 411 which is employed as the A signal for aiding in the generation of further effective addresses from the control address. The delay flop will produce a steady signal level, once actuated for a length of time, as determined by its circuit parameters, and then return to an off condition. The duration of the A signal in this instance will be sufficient to permit a read out of the matrix of the data stored at the second effective address. The output from delay 405 is also fed over line 413 to a second delay network 415. This delay is proportioned to delay an output signal until the desired second read-out operation is completed. At the end of the delay period a signal will be read out on line 417 to a further delay flop 419. The output of delay flop 419 produces a signal on line 421 which is employed as the B signal for aiding in the generation of the final effective address. The signal from the delay flop 419 will persist a sufficiently long time to permit read out from the matrix of the data stored at the third effective address.

While this invention has been described with reference to a particular form or size of matrix and a particular selected member of unique memory locations and addresses as well as a particular input code group, it should be understood that this procedure may be extended to include further and other configurations and basic codes without departing from the scope of this invention.

The embodiments of the invention in which an exclusive property or privilege is claimed are defined as follows:

1. A translating device in which data having a first value pattern is translated into data having further unique and distinct value patterns in successive cycles of operation, one pattern being available during each operating cycle, comprising: a register means to receive and store said data having said a first value pattern and provided outputs indicative thereof; gating means selectively operable to translate said outputs indicative of said data having said first value pattern into outputs indicative of further unique and distinct value patterns, for each operating cycle of said gating means; means to selectively operate said gating means during each operating cycle and means to read out the resulting outputs having said further unique and distinct values each operating cycle.

2. A translating device in which data coded in a first system of notation is translated into data coded in a plurality of other systems of notation in successive cycles of operation, data in a different one of such other systems of notation being available at each operating cycle comprising: a register means to receive said data coded in a first system of notation and provide outputs indicative of the value of the data stored; gating means connected to said register and selectively operable to translate said data coded in a first system of notation into data coded in another system of notation; means to selectively operate said gating means to provide data coded in a different of said other systems of notation for each operating cycle; means to provide successive operating cycles; means connecting said means to provide successive operating cycles to said means to selectively operate said gating means in order to fix the times at which said data coded in each of the different ones of said systems of notation is available and means to read out and utilize said data in each of the different of said systems of notation as available.

3. A cyclic translating device in which data coded in a first system of notation is translated into a separate and distinct further system of notation in successive cycles of operation, and wherein data in one of said separate and distinct systems of notation is available at each operating cycle of the device comprising: a multisectional register means for accepting and storing a plurality of digits comprising bi-quinary coded decimal number and providing signals indicative of the values stored therein; first means connected to said register means for selectively translating the values stored therein into a plurality of unique binary numbers, one during each of three separate operating cycles; second means coupled to said first means to selectively control the operation of said first means during each of said operating cycles; means coupled to said second means to provide signals indicative of said three separate operating cycles; and read out means to permit utilization of each of said three separate binary numbers as they are formed.

4. A cyclic translating device in which data coded in a first system of notation is translated into a separate and distinct further system of notation for each operating cycle of the device comprising: a three section register means for accepting and storing the three digits of a bi-quinary coded decimal number and providing signals indicative of the values stored therein; first means connected to said register means for selectively translating the values stored therein into three unique binary numbers, one during each of three separate operating cycles; second means coupled to said first means to selectively control the operating of said first means during each of said operating cycles; means coupled to said second means to provide signals indicative of said three separate operating cycles; and read out means to permit utilization of each of said three separate binary numbers as they are formed.

5. A translating device in which data coded in a first system of notation is translated into further separate and distinct systems of notation during successive operating cycles comprising: a register means for accepting and storing data coded in said first system of notation; first means connected to said register means for selectively translating the values stored therein into three unique binary numbers, one during each of three separate operating cycles; first control means including gating means connected to said register means to produce outputs during a first time period in accordance with the contents of said register means; second control means operative during a second time period to control said gating means and produce outputs in accordance with one of a further systems of notation; and means operative during a third time period to control said gating means and produce outputs in accordance with another of said further systems of notation; and means to utilize said data as available.

6. A translating device in which data coded in a first system of notation is translated into further separate and distinct systems of notation during successive operating cycles comprising: a register means for accepting and storing data coded in said first system of notation; gating means connected to said register means; first means operative during a first operating cycle to control said gating means according to the data stored in said register means to permit the contents of said register means to be gated unchanged if certain values are present in said register means, and to permit partial gating if other values are present in said register means; second means coupled to said gating means to alter the signals gated during a second operating cycle to provide data coded in a second system of notation and third means coupled to said gating means and operative during a third operating cycle to provide data coded in a third system of notation.

7. A device as claimed in claim 6, wherein additional means are provided for inserting data at the outputs of said gating means when the contents of said register means is only partially gated.

8. A translating device in which data coded in a first system of notation is translated into further separate and distinct systems of notation during successive operating cycles comprising: a register means for accepting and storing data coded in said first system of notation; gating means having output lines, said gating means being connected to said register means for receiving the output thereof; means operative during a first operating cycle to control said gating means according to the data stored in said register means to permit the contents of said register means to be gated unchanged if certain data is present in said register means and to permit partial gating if other data is present in said register means; first means to insert data at the outputs of said gating means for any portion of data of the register means not gated; second means to insert data at the outputs of said gating means during a second operating cycle in accordance with the data originally stored by said register means to provide data coded in a second system of notation; third means to insert data at the outputs of said gating means during a third operating cycle in accordance with the data originally stored by said register means to provide data coded in a third system of notation; means to provide signals indicative of said three distinct operating cycles to said respective first, second and third means; and means to read out and utilize each of said three distinct data groups in their respective systems of notation.

References Cited in the file of this patent

UNITED STATES PATENTS 2,979,709 Henrietta et al. ---------- Apr. 11, 1961
3,000,562 Froggatt et al. ---------- Sept. 19, 1961

UNITED STATES PATENT OFFICE
CERTIFICATE OF CORRECTION

Patent No. 3,163,859 December 29, 1964

Lloyd W. Stowe

It is hereby certified that error appears in the above numbered patent requiring correction and that the said Letters Patent should read as corrected below.

Column 10, in the title of Table IIIc, for

[$CH_4$, $CU_1$ and $CU_1$=0] read [$CH_4$, $CU_2$ and $CU_1$=0]

Signed and sealed this 1st day of June 1965.

(SEAL)
Attest:

ERNEST W. SWIDER
Attesting Officer

EDWARD J. BRENNER
Commissioner of Patents